(12) United States Patent
Burns

(10) Patent No.: US 12,488,643 B2
(45) Date of Patent: Dec. 2, 2025

(54) SYSTEMS AND METHODS FOR USER ACCESS CONTROL OF ELECTRICAL SWITCHGEAR

(71) Applicant: Eaton Intelligent Power Limited, Dublin (IE)

(72) Inventor: Robert Judson Burns, Arden, NC (US)

(73) Assignee: Eaton Intelligent Power Limited, Dublin (IE)

( * ) Notice: Subject to any disclaimer, the term of this patent is extended or adjusted under 35 U.S.C. 154(b) by 393 days.

(21) Appl. No.: 18/060,747

(22) Filed: Dec. 1, 2022

(65) Prior Publication Data

US 2024/0186078 A1 Jun. 6, 2024

(51) Int. Cl.
*G07C 9/00* (2020.01)
*G05B 13/00* (2006.01)
*G07C 9/23* (2020.01)
*G07C 9/25* (2020.01)

(52) U.S. Cl.
CPC ......... *G07C 9/00563* (2013.01); *G05B 13/00* (2013.01); *G07C 9/23* (2020.01); *G07C 9/25* (2020.01); *G07C 2209/04* (2013.01)

(58) Field of Classification Search
CPC ........ G07C 9/00563; G07C 9/23; G07C 9/25; G07C 2209/04; G05B 13/00
See application file for complete search history.

(56) References Cited

U.S. PATENT DOCUMENTS

| | | | |
|---|---|---|---|
| 9,823,721 B1 * | 11/2017 | McGee | G06F 1/30 |
| 10,819,106 B2 | 10/2020 | Burns et al. | |
| 2012/0019357 A1 * | 1/2012 | Rosenthal | G07C 9/27 340/5.61 |
| 2016/0358397 A1 * | 12/2016 | Kristensen | G07C 9/00309 |
| 2018/0321661 A1 * | 11/2018 | Main-Reade | G05B 19/4185 |
| 2019/0114409 A1 * | 4/2019 | Dreger | G06F 21/82 |
| 2022/0028194 A1 * | 1/2022 | Grzenda | E05B 67/22 |
| 2022/0237964 A1 * | 7/2022 | Yim | H04B 11/00 |

* cited by examiner

*Primary Examiner* — Christopher W Carter
(74) *Attorney, Agent, or Firm* — Baker Botts L.L.P.

(57) ABSTRACT

A user access control system comprises electrical components of electrical switchgear, and locking mechanisms that secure the components from unauthorized access. The user access control system further comprises an identification input unit to receive user input to identify a user; an authentication unit to authenticate the user input based on a security policy, determine an access level, and generate a digital access key; and an equipment control unit to selectively allow or deny access to the electrical switchgear components by using the digital access key to unlock or lock the locking mechanisms.

20 Claims, 2 Drawing Sheets

SYSTEMS AND METHODS FOR USER ACCESS CONTROL OF ELECTRICAL SWITCHGEAR

TECHNICAL FIELD

The present disclosure generally relates to systems and methods for user access control of devices. More specifically, the particular embodiments described herein relate to systems and methods for customizing and controlling user access to electrical switchgear.

BACKGROUND

Modern electrical switchgear systems support the handling and distribution of large amounts of electrical power for increasingly demanding and/or sensitive applications, such as hospitals, water supply facilities, waste-water treatment plants, data centers, internet exchange points, network hubs, and high performance cloud computing centers. Considerations of safety, security, and reliability of electrical power distribution and control can be critical for such facilities and applications. A variety of users may need access to electrical switchgear in these applications. Current systems of controlling user access are frequently inadequate for handling the criticality and complexity of the requirements demanded by such applications.

SUMMARY OF PARTICULAR EMBODIMENTS

In a particular embodiment, a user access control system is disclosed, comprising electrical components of electrical switchgear and locking mechanisms that secure the components from unauthorized access. The user access control system further comprises an identification input unit to receive user input to identify a user; an authentication unit to authenticate the user input based on a security policy, determine an access level, and generate a digital access key; and an equipment control unit to selectively allow or deny access to the electrical switchgear components by using the digital access key to unlock or lock the locking mechanisms.

In a particular embodiment, which may combine the features of some or all above embodiments, at least one of the predetermined access levels allows the user access to a subset of the components of the electrical switch gear.

In a particular embodiment, which may combine the features of some or all above embodiments, the electrical components, which are secured by the locking mechanisms of the equipment control unit, comprise different types of components.

In a particular embodiment, which may combine the features of some or all above embodiments, the different types of electrical components comprise at least a circuit breaker open/close switch, a circuit breaker racking mechanism, a control panel, a protective relay, a power meter, a control switch, a control knob, or a control push-button.

In a particular embodiment, which may combine the features of some or all above embodiments, the different types of components comprise at least an exposed live circuit, an exposed live busway, an exposed live cable, a fuse, or an exposed live electrical connector, wherein one or more of the components are electrical hazards.

In a particular embodiment, which may combine the features of some or all above embodiments, the different types of components comprise one or more electrical instruments, wherein the instruments are analog instruments or digital instruments.

In a particular embodiment, which may combine the features of some or all above embodiments, the different types of components comprise at least a computer interface, or a mobile device interface, or a panel of a Human-Machine Interface (HMI), for controlling other electrical switchgear.

In a particular embodiment, which may combine the features of some or all above embodiments, the different types of components comprise remote network means for controlling other electrical switchgear.

In a particular embodiment, which may combine the features of some or all above embodiments, the equipment control unit comprises a Programmable Logic Controller (PLC) for unlocking or locking one or more of the plurality of locking mechanisms based on the digital access key received from the authentication unit.

In a particular embodiment, which may combine the features of some or all above embodiments, the identification input unit is further configured to receive one or more of a password-based user input, a badge-based user input, a biometric user input, a barcode, a multidimensional barcode, or a specifically configured storage device.

In a particular embodiment, which may combine the features of some or all above embodiments, the plurality of locking mechanisms comprise different types of locking mechanisms.

In a particular embodiment, which may combine the features of some or all above embodiments, the plurality of locking mechanisms comprise a door lock.

In a particular embodiment, which may combine the features of some or all above embodiments, the plurality of locking mechanisms comprise at least a lockable access panel, a lockable access door, or a lockable access fence.

In a particular embodiment, which may combine the features of some or all above embodiments, the plurality of locking mechanisms comprise one or more actuators.

In a particular embodiment, which may combine the features of some or all above embodiments, the plurality of locking mechanisms comprise a digital-screen lock on a Human-Machine Interface (HMI) panel or a mobile device interface or a computer interface, wherein the interface may be remotely located or co-located with the electrical switchgear.

In a particular embodiment, which may combine the features of some or all above embodiments, the plurality of components comprise a circuit breaker switch, and the plurality of locking mechanisms comprise a lockable access door that covers an opening to the circuit breaker switch.

In a particular embodiment, which may combine the features of some or all above embodiments, the plurality of components comprise an exposed live electrical busway, and the plurality of locking mechanisms comprise a lockable access door that covers an opening to the live electrical busway.

In a particular embodiment, which may combine the features of some or all above embodiments, the plurality of components comprise a circuit breaker switch, and the plurality of locking mechanisms comprise a controlled-access operation of a circuit breaker racking mechanism, wherein control of the circuit breaker racking mechanism operation is accessed via a Human-Machine Interface (HMI) panel, and wherein the HMI panel is digitally lockable by the equipment control unit.

BRIEF DESCRIPTION OF THE DRAWINGS

Various embodiments will be described in greater detail below based on the exemplary figures. The invention is not limited to the exemplary embodiments. Other features and advantages of various embodiments of the present invention will become apparent by reading the following detailed description with reference to the attached drawings which illustrate the following.

DESCRIPTION OF EXAMPLE EMBODIMENTS

Figure 1:
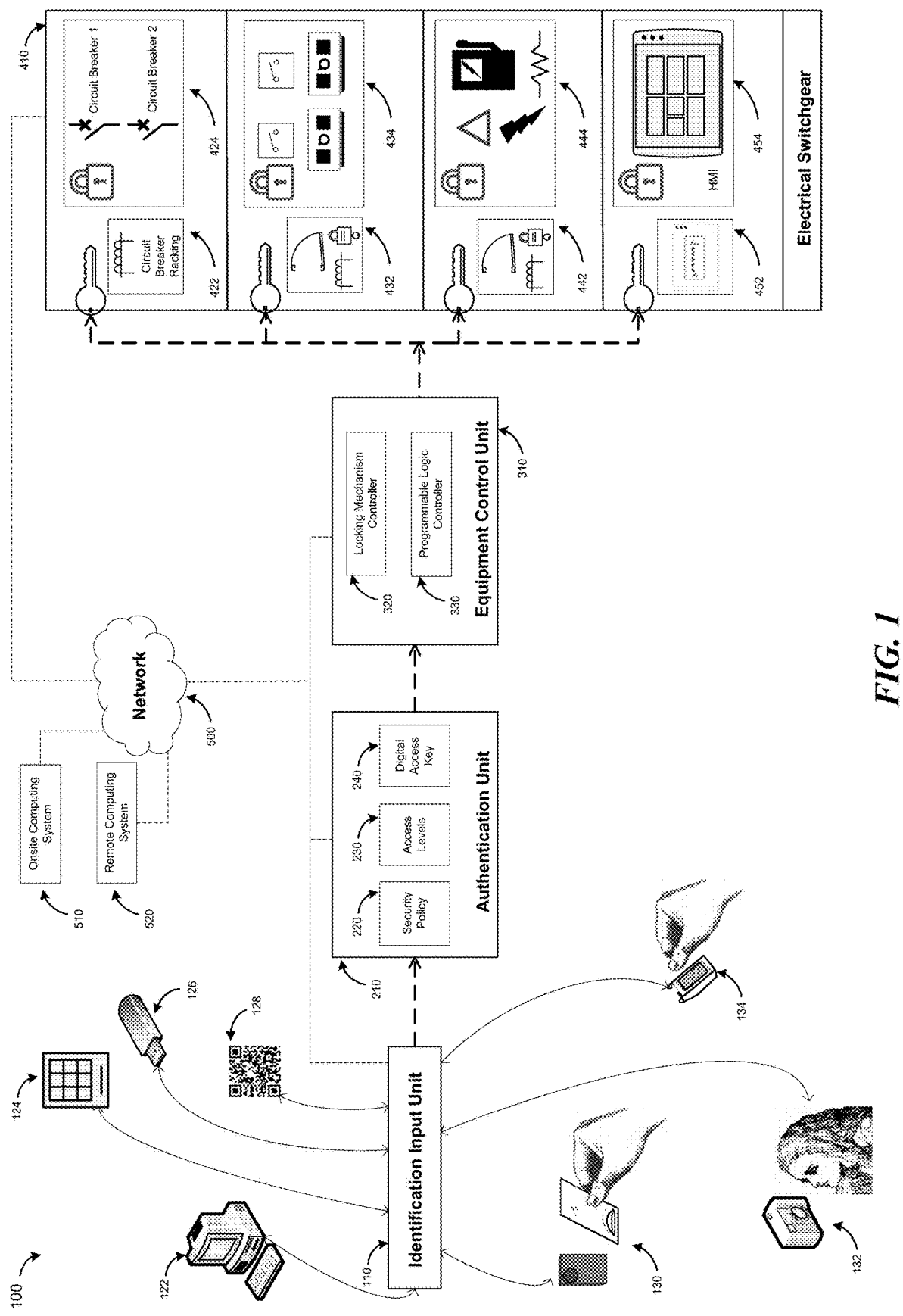
FIG. 1 illustrates an example of a user access control system for electrical switchgear.

In the following description, various embodiments will be described. For purposes of explanation, specific configurations and details are set forth in order to provide a thorough understanding of the embodiments. However, it will also be apparent to one skilled in the art that embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above.

Embodiments disclosed herein may be directed to claims in various categories, e.g., a method, a storage medium, a system, and/or a computer program product, wherein any feature mentioned in one claim category, e.g., method, can be claimed in another claim category, e.g., system, as well. The dependencies or references in the attached claims are chosen for formal reasons only. However, any subject matter resulting from a deliberate reference to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims, but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Subject matter described herein relate to systems and methods for controlling and customizing user access to electrical switchgear. Electrical switchgear support the handling and distribution of large amounts of electrical power for demanding and/or sensitive applications. In particular embodiments, electrical switchgear may comprise a range of electrical components, devices, assemblies, and/or other equipment. Personnel and users who access electrical switchgear and systems may need to do so for a variety of reasons, which may require, as non-limiting examples, significantly different levels of specialized user training and expertise, and/or user vetting and authorization. In particular embodiments, significantly different user tasks, training levels, and/or security authorizations may separately or additionally warrant different access levels and/or customization of access to electrical switchgear.

In particular embodiments, electrical switchgear may comprise components or devices for selectively engaging, transforming, and/or otherwise modifying electrical circuit parameters. In particular embodiments, electrical switchgear may comprise devices for protection of electrical circuits and systems. By way of example and not limitation, electrical switchgear may comprise electrical components such as circuit breakers, circuit breaker open/close switches, circuit breaker racking mechanisms, transformers, power conditioners, relays, fuses, and/or electrical trip units.

In particular embodiments, electrical switchgear may comprise hazardous components and/or hardware that may be potentially dangerous for a user to physically access. With high voltages, currents, and/or other measures of electrical energy that may be present in many electrical switchgear applications, access to electrical switchgear may present hazards of short circuits, arc flashes, fire, and/or electrocution. By way of example and not limitation, hazardous electrical switchgear may comprise energized, live and/or exposed circuits, cables, wires, fuses, busways, and/or connectors.

In particular embodiments, electrical switchgear may comprise components or devices for interacting with electrical systems. In particular embodiments, electrical switchgear may comprise components or devices for providing input, modifying electrical parameters, and/or otherwise controlling the behavior of electrical systems. In particular embodiments, electrical switchgear may comprise devices or components for obtaining information, receiving feedback, and/or otherwise observing the status, behavior, performance, or other aspects of electrical systems.

By way of example and not limitation, electrical switchgear may comprise control panels, control switches, control levers, control knobs, control dials, machine controllers (e.g., for motor control), Programmable Logic Controllers (PLCs), and/or control push-buttons. By way of additional examples and not by way of limitation, electrical switchgear may comprise instruments, which may be analog or digital instruments, instrument panels, readouts, meters (e.g., power meters), measurement outputs, and/or displays.

By way of example and not by way of limitation, in particular embodiments, electrical switchgear may comprise Human-Machine Interface (HMI) panels, touchscreens, keypads, displays, and/or other devices with digital input and/or output interfaces, which may be co-located at a site with other electrical switchgear, or remotely connected with other electrical switchgear via one or more communication networks. By way of example and not by way of limitation, in particular embodiments, electrical switchgear may comprise computing devices or systems of various types, forms, and configurations (e.g., laptops, desktops, input/output terminals), mobile devices such as mobile phones, Graphical User Interfaces (GUIs), and/or other digital input and/or output interfaces on user devices for interacting with electrical systems, which may be co-located at a site with other electrical switchgear, or remotely connected with other electrical switchgear via one or more communication networks. Such computing devices or systems may comprise specially programmed computers, using special-purpose computer system design, as will be further discussed.

In particular embodiments, electrical switchgear may comprise a range of locking mechanisms for securing electrical components, devices, assemblies, and/or equipment from unauthorized access. By way of example and not limitation, locking mechanisms may comprise lockable physical compartments, zones, and/or perimeters, such as lockable access fences, lockable compartments, lockable cells, lockable access doors, lockable cover plates, and/or lockable access panels, to secure electrical components from unauthorized access. By way of example and not limitation, locking mechanisms may comprise door locks, and/or one or more actuators for selectively operating locking mechanisms. By way of example and not limitation, one or more actuators may be controlled onsite or remotely to operate and selectively engage, disengage, lock, or unlock specific components or lockable compartments of the electrical switchgear.

In particular embodiments, locking mechanisms may comprise digital locking mechanisms, interfaces, or systems. By way of example and not limitation, a digital locking mechanism may comprise a digital screen lock-out on a Human-Machine Interface. By way of example and not limitation, a digital locking mechanism may comprise a denial of access, based on insufficient credentials, to a login attempt instance from a remotely connected computer, for securing unauthorized modification of electrical system control parameters.

As examples and not by way of limitation, in particular embodiments, a lockable access door that covers an opening to a circuit breaker open/close switch may be used to secure the switch from unauthorized access. In particular embodiments, a lockable access door that covers an opening to a live electrical busway may be used to secure the busway from unauthorized access. In particular embodiments, a lockable access door that covers an opening to a live electrical busway may be used to secure the busway from unauthorized access. In particular embodiments, a digitally lockable Human-Machine Interface (HMI) panel may be used to secure a circuit breaker racking mechanism from unauthorized operational access.

Although this disclosure describes providing particular locking mechanisms for controlling access to particular electrical switchgear, it should be appreciated that locking mechanisms for user access control for electrical switchgear may vary across embodiments, and may be tailored for specific situations, which may include but are not limited to consideration of user characteristics; the scope, connectivity and impact of specific user access and corresponding user access level and/or customizations; particular characteristics of the electrical switchgear and components involved; and/or particular characteristics of the specific site(s) of the electrical switchgear involved.

FIG. 1 illustrates an example of a user access control system for electrical switchgear. In particular embodiments, a user access control system 100 for electrical switchgear may comprise an identification input unit 110, which may be configured to receive a user input for identifying a user of the user access control system for electrical switchgear.

In particular embodiments, a user may use a password-based user input to provide user credentials and/or identify themselves to the identification input unit of a user access control system. In particular embodiments, a user may use a computer, a terminal, or other digital device-based input method 122 to provide password credentials to identify themselves to the identification input unit. By way of example and not limitation, user credentials may comprise login information, which may be specific to the user access control system at a site, or may be shared across sites, and/or may be shared across other enterprise computing systems.

In particular embodiments, a user may use a keypad or pinpad 124 to provide user credentials and/or identify themselves to the identification input unit. By way of example and not limitation, the keypad or pinpad may include a set of characters, such as numeric characters, alphanumeric characters, and/or special characters, that may be used by the user to provide credentials to the identification input unit of the user access control system. By way of example and not limitation, the keypad or pinpad may be used by a user to input a Personal Identification Number (PIN).

In particular embodiments, a user may use a specifically configured storage device 126, such as a customized portable memory device, to provide user credentials and/or identify themselves to the identification input unit. By way of example and not limitation, a specifically configured storage device may comprise a Universal Serial Bus (USB) memory drive, which may be customized to contain credentials for identification purposes, wherein the user credentials stored on the memory device may be static, or may vary in time based on manually or automatically implemented steps.

In particular embodiments, a visual machine-readable signature such as a barcode 128 may be used by a user to provide user credentials and/or identify themselves to the identification input unit, in combination with a device suitable for reading the barcode. By way of example and not limitation, a barcode used for providing user identification may be a linear or one-dimensional barcode. By way of example and not limitation, a barcode used for providing user identification may be a multi-dimensional barcode, such as a Quick Response (QR) code. In particular embodiments, a suitable barcode may be provided in physical form for user identification by the user, such as on printed paper, or on a printed card. In particular embodiments, a suitable barcode may be provided for user identification by the user by displaying the barcode on a user device, such as a mobile phone, or another suitable portable device, which may be read by a barcode reader.

In particular embodiments, a card or badge reader 130 may be used by a user to provide user credentials and/or identify themselves to the identification input unit. By way of example and not limitation, a user may scan a identification card or badge, such as a Radio-Frequency Identification (RFID) card, at a card reader to identify themselves. Other technologies and protocols, such as Near-Field Communication (NFC), may also be used.

In particular embodiments, a biometric user input device may be used by a user to provide user credentials and/or identify themselves to the identification input unit. In particular embodiments, a camera device 132 may be used for user identification. By way of example and not limitation, a camera device may be used to acquire one or more photographic images of a user. In particular embodiments, photographic images of a user acquired by the camera device may be processed by facial recognition techniques for comparison against known information stored in a secure database. In particular embodiments, a fingerprint reader 134 may be used by a user to scan one or more of a user's fingerprints to provide user credentials and/or identify themselves to the identification input unit.

Although this disclosure describes providing identification for user access control systems in particular forms, this disclosure contemplates providing any suitable identification for user access control systems in any suitable manner. Additionally, suitable forms of providing identification in particular embodiments may involve combinations of multiple identification input methods, which may include suitable methods not specifically disclosed herein.

In particular embodiments, control and operational parameters of the identification input unit may be securely accessed and/or modified via a network 500 using an onsite computing system 510. In particular embodiments, control and operational parameters of the identification input unit may be securely accessed and/or modified via a network 500 using a remote computing system 520.

In particular embodiments, a user access control system for electrical switchgear may comprise an authentication unit 210, which may be communicatively coupled with an identification input unit. In particular embodiments, an authentication unit and an identification input unit of a user access control system may be communicatively coupled via a network.

In particular embodiments, an authentication unit may be configured to authenticate a user input received from the identification input unit based on a security policy 220. In particular embodiments, the security policy may be predetermined. By way of example and not limitation, a security policy may comprise a secure database of user identifiers, user credentials (e.g., passwords, biometric data, barcode data), and/or other user characteristics. By way of example and not limitation, a security policy may comprise user account flags and exceptions, and/or corresponding electrical switchgear access characteristics.

By way of example and not limitation, a security policy for the user access control system may be partially or wholly derived from other sources, such as organizational databases and/or other security policies. By way of example and not limitation, a security policy may be determined specific to a site of the electrical switchgear, or may be shared across sites, and/or shared across enterprise computing systems. In particular embodiments, an organizational administrator may set up a security policy based on information about user characteristics, such as user roles, tasks and needs, user training and expertise, and/or user security vetting and authorization, which may be appropriately matched to electrical switchgear access requirements. In particular embodiments, a security policy may be updated to add, modify or remove users, user characteristics, user access levels and/or other customizations. In particular embodiments, a security policy may be securely accessed, uploaded and/or updated via a network 500 using an onsite computing system 510. In particular embodiments, a security policy may be securely accessed, uploaded and/or updated via a network 500 using a remote computing system 520.

In particular embodiments, based on an authenticated user input, an authentication unit may be configured to determine one or more access levels 230 from a plurality of access levels. As previously described, users who access electrical switchgear and systems may need to do so for a variety of reasons, which may require significantly different levels of specialized user training and expertise, and/or user vetting and authorization. For instance, for safe, predictable and reliable operation of electrical switchgear, it may be necessary to inspect, maintain, take readings, and/or change process variables of the electrical switchgear on a scheduled or as-needed basis. In particular embodiments, for reasons of at least safety and/or security, significantly different user tasks, needs, training levels, and/or security authorizations may warrant different access levels and/or access customization relating to the hardware, features, functions, scope, connectivity, and other aspects of the electrical switchgear.

As an example and not by way of limitation, a first user may require access to a electrical switchgear for taking instrument readings, but may lack the training required to safely working around hazardous live electrical busways. For example, such an exemplary first user may be permitted to access specific instruments, but restricted from other areas of the electrical switchgear at a particular electrical switchgear site.

As another example and not by way of limitation, a second user, who may have received additional specialized training relative to the first exemplary user, may be an electrician authorized to perform routine maintenance and/or simple electrical repairs while handling or working in close proximity to live circuits. For example, such an exemplary second user may be permitted to access zones and compartments containing live electrical hazards at a site, but may be restricted from accessing other areas of the electrical switchgear. For example, such an exemplary second user may receive partial and/or customized access to specific compartments and areas of the electrical switchgear at a particular site upon providing identification credentials at a Human-Machine Interface (HMI) panel located onsite, but may not, for instance, be authorized to remotely access any interfaces or electrical switchgear aspects when such this exemplary second user is offsite, i.e., remotely located.

As another example and not by way of limitation, a third user, who may undergo additional security vetting, may be authorized to access electrical switchgear and perform changes that may have the potential to significantly affect sensitive downstream applications and installations, especially if the such access is intentionally or inadvertently misused. For example, such an exemplary third user may be authorized to modify key circuit parameters or reprogram the operational logic of a Programmable Logic Controller when onsite at a particular electrical switchgear site, but may still be restricted from remotely accessing electrical switchgear located at other sites.

By way of example and not limitation, in particular embodiments, a Level 1 access may correspond to "read only" access, wherein displays on protective relays, meters, and Human-Machine Interfaces (HMIs) may be unlocked. For instance, a Level 1 user may have access to read values off of device displays.

By way of example and not limitation, in particular embodiments, a Level 2 access may correspond to "basic operation" access. For instance, in addition to Level 1 access privileges, a Level 2 user may have the ability to open, close, or remove circuit breakers, and to operate other switchgear controls.

By way of example and not limitation, in particular embodiments, a Level 3 access may correspond to "engineering and maintenance" access. For instance, a Level 3 user may have the ability to change settings on protective relays, or modify programs stored on Programmable Logic Controllers (PLCs), as well as have full access to switchgear compartments for repair and maintenance, with all compartment doors unlocked based on their access level.

In particular embodiments, access levels 230 for control of electrical switchgear may be highly customizable. As an example and not by way of limitation, it may be desirable to enable granular user access control for specific categories or subsets of electrical switchgear components and related tasks, which may be local to a site, or may apply across sites. As an example and not by way of limitation, while an exemplary third user in the above example may be appropriately authorized to remotely log in, access, and modify key circuit parameters that may significantly influence electrical switchgear operation, the same exemplary third user, based on their particular training and expertise, may still be appropriately restricted from physically accessing zones or compartments that contain live electrical hazards at any electrical switchgear site. Thus, in particular embodiments, access levels for user access control of electrical switchgear may be highly customized.

In particular embodiments, access level parameters corresponding to users may be securely accessed, uploaded and/or updated via a network 500 using an onsite computing system 510. In particular embodiments, access level parameters corresponding to users may be securely accessed, uploaded and/or updated via a network 500 using a remote computing system 520.

In particular embodiments, based on the access level determined corresponding to an authenticated user input, an authentication unit may generate a digital access key 240, which may be further transmitted, in particular embodiments, to an equipment control unit 310. In particular embodiments, an equipment control unit may be communicatively coupled with an authentication unit of the user access control system, and also communicatively coupled with locking mechanisms of the electrical switchgear. In particular embodiments, one or more such communicative couplings may be provided via a network. In particular embodiments, the equipment control unit may be configured to selectively allow or deny access to components or other aspects of the electrical switchgear by using the digital access key received from the authentication unit to unlock or lock the locking mechanisms of the electrical switchgear.

In particular embodiments, a digital access key generated by the authentication unit may comprise a data packet that, when provided to the equipment control unit, authorizes and/or instructs the equipment control unit to selectively lock or unlock specific components or other aspects of the electrical switchgear, to provide authorized access and secure them from unauthorized access. As an example and not by way of limitation, a digital access key may comprise one or more encrypted data packets that are securely transmitted from an authentication unit to a locking mechanism controller 320 of the equipment control unit. As another illustrative example and not by way of limitation, a particular digital access key sent to the equipment control unit may correspond to unlocking and enabling an onsite digital Human-Machine Interface (HMI) panel, which may in turn provide access for an authorized onsite user to additional controls and parameters of the electrical switchgear.

As another example and not by way of limitation, a digital access key may comprise a binary string representing logical instructions transmitted from an authentication unit to a Programmable Logic Controller (PLC) 330 of the equipment control unit. As an illustrative example and not by way of limitation, a binary string of '010' sent as a digital access key to a PLC may correspond to the PLC energizing an solenoid actuator to unlock a compartment access door latch, thereby enabling access to the specific instrument compartment.

As described previously, electrical switchgear 410 may comprise electrical components and locking mechanisms. FIG. 1 provides several non-limiting exemplary illustration of electrical components and locking mechanisms.

By way of example, and not limitation, in particular embodiments, specific electrical components 424 may comprise one or more circuit breakers, with a corresponding locking mechanism 422 comprising a circuit breaker racking mechanism. A racking mechanism in this application may comprise, for instance, a solenoid-driven or motor-driven mechanism capable of physically inserting or withdrawing a circuit breaker, based on the solenoid or motor, respectively, being selectively and specifically energized to perform the desired motion. Remotely operable racking mechanisms, such as those disclosed herein, may separately or additionally be employed in arc-quenching devices and applications. By way of example and not limitation, a remotely-operable motor-driven racking mechanism may comprise a lead screw, such as an Acme screw, a gear train, a rack-and-pinion, and/or other actuating members and coupling mechanisms driven by the motor. In some applications, a motor-driven mechanism may be configured to provide multiple rotations of motion to actuate a mechanism for selectively physically inserting or withdrawing one or more electrical elements or components of interest.

In the example illustrated by 422 and 424 of FIG. 1, upon the equipment control unit receiving a digital access key corresponding to an authenticated user with an appropriate access level, the equipment control unit can operate the circuit breaker racking mechanism to selectively insert or withdraw one or more of the circuit breakers.

By way of another example, and not by way of limitation, in particular embodiments, specific electrical components 434 may comprise one or more electrical switches, control knobs, and/or electrical instruments, with a corresponding locking mechanism 432 comprising a lockable compartment door that may be secured by a solenoid-driven door latch mechanism, wherein the solenoid may be selectively energized to lock or unlock the compartment door, as desired. In this example, upon the equipment control unit receiving a digital access key corresponding to an authenticated user with an appropriate access level, the equipment control unit can operate the solenoid-driven door latch mechanism to selectively unlock or lock the door to the electrical components compartment, as desired.

By way of example, and not limitation, in particular embodiments, specific electrical components 444 may comprise one or more exposed live circuits, busways, and/or other electrical hazards such as components with high risk of arc flashes, along with a corresponding locking mechanism 442 comprising a lockable compartment door secured by a solenoid-driven door latch mechanism, wherein the solenoid may be selectively energized to lock or unlock the compartment door. In this example, upon the equipment control unit receiving a digital access key corresponding to an authenticated user with an appropriate access level, the equipment control unit can operate the solenoid-driven door latch mechanism to selectively unlock or lock the door to the compartment containing and securing the hazardous components from unauthorized user access.

By way of yet another example, and not limitation, in particular embodiments, specific electrical components 454 may comprise one or more Human-Machine Interface (HMI) panels that may control access to viewing or modifying key parameters of the electrical switchgear, along with a corresponding locking mechanism 452 comprising a digital screen-lock, wherein the digital screen lock may first require a remote digital unlocking action from the equipment control unit to permit an onsite user to attempt a login instance via the interface. In this example, upon the equipment control unit receiving a digital access key corresponding to an authenticated user with an appropriate access level, the equipment control unit can digitally unlock and thereby enable a login screen on an onsite HMI panel, which may then permit an authorized user to attempt a login instance, and upon successfully logging in, subsequently permit an authorized user to view and/or modify key parameters of the electrical switchgear using the HMI panel.

As has been described previously, in particular embodiments, some or all of the modules of the user access control system, including but not necessarily limited to an identification input unit, an authentication unit, an equipment control unit, and/or electrical switchgear, along with their subsystems and subcomponents, may be connected to a network 500. In particular embodiments, one or more onsite computing systems 510 may be separately or additionally connected to the network. In particular embodiments, one or more remote computing systems 520 may be separately or additionally connected to the network.

It should be appreciated that although this disclosure describes specific modules of a user access control system distributing and handling specific functions of the user access control system in a particular manner, this disclosure contemplates providing any suitable distribution or redistribution of modules for handling any suitable functions of the user access control system in any suitable manner. By way of example and not limitation, a redistribution may involve combining, separating, or differently defining modules, their interfaces and connectivity, and/or their corresponding functions. By way of example and not limitation, specially programmed computers, using special-purpose computer system design, may be used to execute some or all of the user access control functions described herein, to provide a practical application of computing technology. In this manner, this disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

Additionally, although this disclosure describes specific forms and instances of data transfer, communication, and/or related coupling in a particular manner, it should be appreciated that the disclosed aspects are exemplary and not limiting, and this disclosure contemplates providing or employing any suitable methods and techniques for data transfer, communication, and/or related coupling, including but not limited to the use of methods for ensuring data security and integrity for data in storage and/or data in transit.

Figure 2:
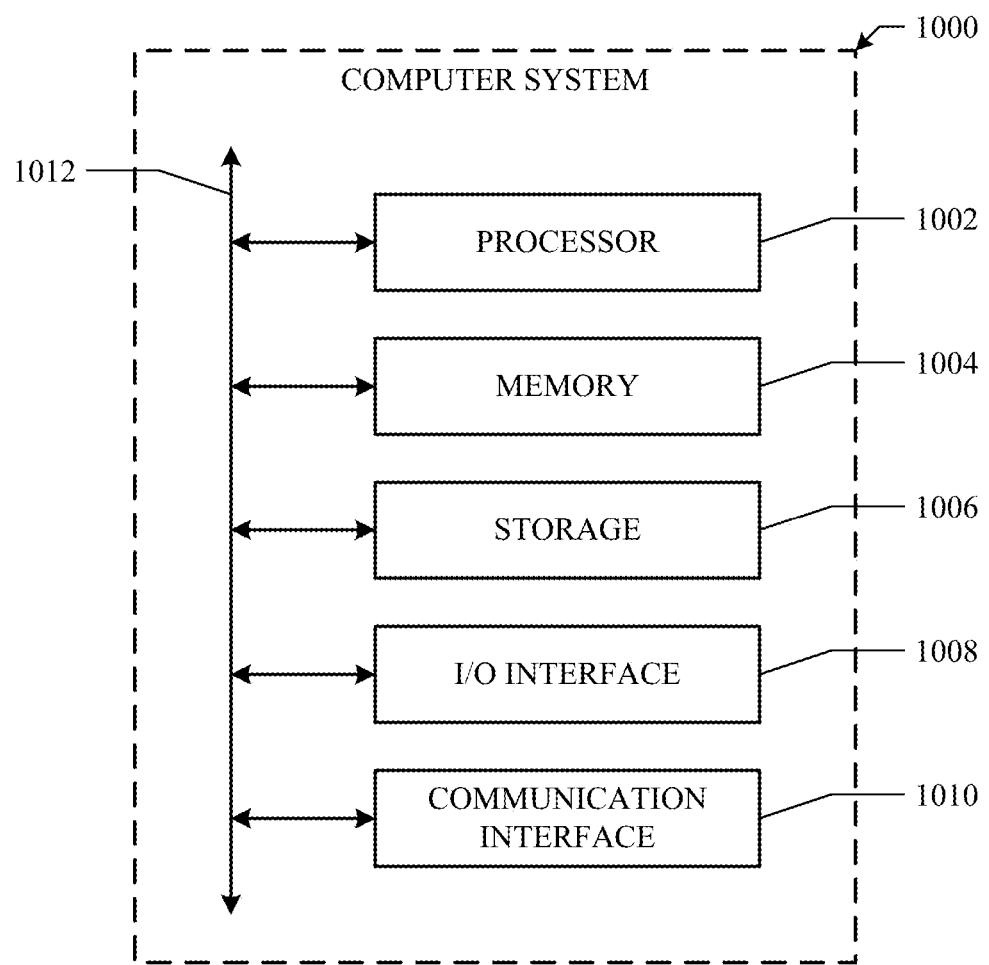
FIG. 2 illustrates an example of a computer system.

FIG. 2 illustrates an example computer system 1000. In particular embodiments, one or more computer systems 1000 may perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described in further detail below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments. Any numerical ranges recited in this application should be construed to be inclusive of the end points of the stated ranges.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A user access control system for electrical switchgear, comprising:
   an electrical switchgear comprising a plurality of electrical components and a plurality of physical locking mechanisms, wherein the plurality of physical locking mechanisms respectively secure the plurality of components of the electrical switchgear from unauthorized access;
   an identification input unit configured to receive a user input identifying a user;
   an authentication unit communicatively coupled with the identification input unit and configured to authenticate the user input based on a predetermined security policy, wherein, based on the authenticated user input, the authentication unit is further configured to determine an access level from a plurality of predetermined access levels, and generate, based on the determined access level, a digital access key configured to be used to unlock a plurality of selected physical locking mechanisms from the plurality of physical locking mechanisms; and
   an equipment control unit communicatively coupled with the authentication unit and the plurality of physical locking mechanisms, wherein the equipment control unit is further configured to use the digital access key received from the authentication unit to selectively unlock the plurality of selected physical locking mechanisms, thereby allowing the user access to associated ones of the plurality of components of the electrical switchgear.

2. The user access control system of claim 1, wherein at least one of the plurality of predetermined access levels allows the user access to a subset of the plurality of components of the electrical switchgear.

3. The user access control system of claim 1, wherein the plurality of components of the electrical switchgear, which are secured by the plurality of physical locking mechanisms of the equipment control unit, comprise different types of components.

4. The user access control system of claim 3, wherein the different types of components comprise at least a circuit breaker open/close switch, a circuit breaker racking mechanism, a control panel, a protective relay, a power meter, a control switch, a control knob, or a control push-button.

5. The user access control system of claim 3, wherein the different types of components comprise at least an exposed live circuit, an exposed live busway, an exposed live cable, a fuse, or an exposed live electrical connector, wherein one or more of the components are electrical hazards.

6. The user access control system of claim 3, wherein the different types of components comprise one or more electrical instruments, wherein the instruments are analog instruments or digital instruments.

7. The user access control system of claim 3, wherein the different types of components comprise at least a computer interface, or a mobile device interface, or a panel of a Human-Machine Interface (HMI), for controlling other electrical switchgear.

8. The user access control system of claim 3, wherein the different types of components comprise remote network means for controlling other electrical switchgear.

9. The user access control system of claim 1, wherein the equipment control unit comprises a Programmable Logic Controller (PLC) for unlocking or locking one or more of the plurality of physical locking mechanisms based on the digital access key received from the authentication unit.

10. The user access control system of claim 1, wherein the identification input unit is further configured to receive one or more of a password-based user input, a badge-based user input, a biometric user input, a barcode, a multidimensional barcode, or a specifically configured storage device.

11. A method for controlling user access to electrical switchgear, comprising:
   receiving, from an identification input unit, a user input identifying a user;
   authenticating, by an authentication unit that is communicatively coupled with the identification input unit and based on a predetermined security policy, the user input;
   determining, by the authentication unit and based on the authenticated user input, an access level from a plurality of predetermined access levels;
   generating, by the authentication unit and based on the determined access level, a digital access key configured to be used to unlock a plurality of selected physical locking mechanisms selected from a plurality of physical locking mechanisms; and
   selectively allowing or denying, by an equipment control unit that is communicatively coupled with the authentication unit, access to a plurality of electrical components of an electrical switchgear, by using the digital access key received from the authentication unit to selectively unlock the plurality of selected physical locking mechanisms, thereby allowing the user access to unlock or lock associated ones of the plurality of physical locking mechanisms of the electrical switchgear, wherein the plurality of physical locking mechanisms respectively secure the plurality of components of the electrical switchgear from unauthorized access.

12. The user access control system of claim 1, wherein the plurality of physical locking mechanisms comprise different types of physical locking mechanisms.

13. The user access control system of claim 12, wherein the plurality of physical locking mechanisms comprise a door lock.

14. The user access control system of claim 12, wherein the plurality of physical locking mechanisms comprise at least a lockable access panel, a lockable access door, or a lockable access fence.

15. The user access control system of claim 12, wherein the plurality of physical locking mechanisms comprise one or more actuators.

16. The user access control system of claim 12, wherein the plurality of physical locking mechanisms comprise a digital-screen lock on a Human-Machine Interface (HMI) panel or a mobile device interface or a computer interface, wherein the interface may be remotely located or co-located with the electrical switchgear.

17. The user access control system of claim 1, wherein the plurality of components comprise a circuit breaker switch, and the plurality of physical locking mechanisms comprise a lockable access door that covers an opening to the circuit breaker switch.

18. The user access control system of claim 1, wherein the plurality of components comprise an exposed live electrical busway, and the plurality of physical locking mechanisms comprise a lockable access door that covers an opening to the live electrical busway.

19. The user access control system of claim 1, wherein the plurality of components comprise a circuit breaker switch, and the plurality of physical locking mechanisms comprise a controlled-access operation of a circuit breaker racking mechanism, wherein control of the circuit breaker racking mechanism operation is accessed via a Human-Machine Interface (HMI) panel, and wherein the HMI panel is digitally lockable by the equipment control unit.

20. A system comprising:
a memory; and
a processor coupled to the memory, wherein the memory stores instructions executable by the processor, that, when executed by the processor, cause the processor to:
receive, from an identification input unit, a user input identifying a user;
authenticate, using an authentication unit that is communicatively coupled with the identification input unit and based on a predetermined security policy, the user input;
determine, using the authentication unit and based on the authenticated user input, an access level from a plurality of predetermined access levels;
generate, using the authentication unit and based on the determined access level, a digital access key configured to be used to unlock a plurality of selected physical locking mechanisms selected from a plurality of physical locking mechanisms; and
use the digital access key received from the authentication unit to selectively unlock the plurality of selected physical locking mechanisms, thereby allowing the use of an equipment control unit that is communicatively coupled with the authentication unit, access to associated ones of a plurality of electrical components of an electrical switchgear, wherein the plurality of physical locking mechanisms respectively secure the plurality of components of the electrical switchgear from unauthorized access.

* * * * *